US011885242B2

(12) United States Patent
Turcotte et al.

(10) Patent No.: US 11,885,242 B2
(45) Date of Patent: Jan. 30, 2024

(54) DIFFUSER RING WITH AIR MANIFOLD (71) Applicant: PRATT & WHITNEY CANADA CORP., Longueuil (CA)

(72) Inventors: Hervé Turcotte, Sainte-Julie (CA); Kenneth Parkman, Halton Hills (CA); Oleg Morenko, Oakville (CA); Nicholas Guglielmin, Toronto (CA); Gavin Kisun, Oakville (CA); Ryan Miskie, Guelph (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 8 days.

(21) Appl. No.: 17/662,143

(22) Filed: May 5, 2022

(65) Prior Publication Data

US 2023/0358145 A1 Nov. 9, 2023

(51) Int. Cl.
*F01D 9/06* (2006.01)
*F01D 25/24* (2006.01)
*F01D 25/16* (2006.01)

(52) U.S. Cl.
CPC ........... *F01D 9/065* (2013.01); *F01D 25/162* (2013.01); *F05D 2220/323* (2013.01); *F05D 2240/12* (2013.01); *F05D 2240/53* (2013.01); *F05D 2260/60* (2013.01)

(58) Field of Classification Search
CPC .... F01D 9/065; F01D 25/24; F05D 2220/323; F05D 2240/12; F05D 2240/53; F05D 2260/60
See application file for complete search history.

(56) References Cited

U.S. PATENT DOCUMENTS

| 3,898,793 | A * | 8/1975 | Nakamura | F01D 25/162 |
| | | | | 415/113 |
| 8,113,003 | B2 * | 2/2012 | Charron | F01D 9/023 |
| | | | | 60/722 |
| 8,235,648 | B2 * | 8/2012 | LeBlanc | F02C 3/08 |
| | | | | 415/58.4 |
| 9,976,485 | B2 * | 5/2018 | Suciu | F02C 6/08 |
| 10,422,345 | B2 * | 9/2019 | Parker | F04D 17/10 |
| 10,570,925 | B2 * | 2/2020 | Duong | F04D 29/441 |
| 11,732,731 | B2 * | 8/2023 | Xue | F04D 17/10 |
| | | | | 415/208.2 |

(Continued)

FOREIGN PATENT DOCUMENTS

EP 2813685 4/2019

OTHER PUBLICATIONS

European Search Report dated Sep. 15, 2023 for corresponding application No. 23170451.1.

*Primary Examiner* — Igor Kershteyn
(74) *Attorney, Agent, or Firm* — NORTON ROSE FULBRIGHT CANADA LLP (57) ABSTRACT

An aircraft engine has: a compressor section having a compressor rotor rotatable about a central axis; a diffuser downstream of the compressor rotor, the diffuser including a diffuser ring extending circumferentially around the central axis; a bearing housing secured to the diffuser ring, the bearing housing contained within a volume located radially inwardly of the diffuser ring; and an air manifold secured to the diffuser ring, the air manifold defining inlets in fluid flow communication with the compressor section and an outlet in fluid flow communication with the volume.

20 Claims, 6 Drawing Sheets

(56) References Cited

U.S. PATENT DOCUMENTS

2013/0177406 A1   7/2013   Heaton et al.
2021/0033109 A1   2/2021   Kojovic et al.
2021/0172455 A1*  6/2021   Kisun .................... F04D 17/10

* cited by examiner

DIFFUSER RING WITH AIR MANIFOLD

TECHNICAL FIELD

The disclosure relates generally to aircraft engines and, more particularly, to secondary air systems used in such engines.

BACKGROUND OF THE ART

Aircraft engines, such as gas turbine engines, include secondary air systems that are supplied with air bleed air from compressors. This compressed air is then used within the secondary air systems to pressurize bearing cavities, cool other components such as turbine rotors, and so on. In some cases, fluid lines are used to connect the different components of the secondary air system. These fluid lines may be cumbersome to install, heavy, and may be difficult to properly seal to avoid leakage. Improvements are therefore sought.

SUMMARY

In one aspect, there is provided an aircraft engine comprising: a compressor section having a compressor rotor rotatable about a central axis; a diffuser downstream of the compressor rotor, the diffuser including a diffuser ring extending circumferentially around the central axis; a bearing housing secured to the diffuser ring, the bearing housing contained within a volume located radially inwardly of the diffuser ring; and an air manifold secured to the diffuser ring, the air manifold defining inlets in fluid flow communication with the compressor section and an outlet in fluid flow communication with the volume.

The aircraft engine may include any of the following features, in whole or in part, and in any combination.

In some embodiments, the air manifold and the diffuser ring are parts of a single monolithic body.

In some embodiments, the air manifold is welded to the diffuser ring.

In some embodiments, the diffuser ring is located between a first plenum and a second plenum, the first plenum pneumatically connected to a bleed outlet of the compressor section, the second plenum pneumatically connected to an outlet of the compressor section downstream of the bleed outlet, the inlets of the air manifold in fluid flow communication with the first plenum.

In some embodiments, the diffuser ring has an upstream side facing the first plenum and a downstream side facing the second plenum, the air manifold located on the downstream side.

In some embodiments, apertures extend through the diffuser ring, the apertures in fluid flow communication with the inlets of the air manifold.

In some embodiments, the air manifold includes a body defining a flow passage, the inlets defined by the body and longitudinally distributed along a body axis of the body.

In some embodiments, the body axis extends in a direction being mainly circumferential relative to the central axis.

In some embodiments, the outlet is pneumatically connected to an air line, the air line pneumatically connected to a connection port defined by an inner casing secured to a radially-inner end of the diffuser ring.

In some embodiments, the aircraft engine has an outer casing, the diffuser ring having a radially-outer end secured to the outer casing, the air manifold located radially inwardly of the outer casing.

In some embodiments, an entirety of the air line is located radially between the inner casing and the outer casing.

In some embodiments, the inlets includes three air inlets circumferentially interspaced from one another relative to the central axis.

In another aspect, there is provided a diffuser for a compressor section of an aircraft engine, comprising a diffuser ring extending circumferentially around a central axis, the diffuser ring having a radially inner end and a radially outer end; and an air manifold secured to the diffuser ring radially between the radially inner end and the radially outer end, the air manifold defining inlets in fluidly connectable to the compressor section and an outlet fluidly connectable to a bearing housing.

The diffuser described above may include any of the following features, in any combinations.

In some embodiments, the air manifold and the diffuser ring are parts of a single monolithic body.

In some embodiments, the air manifold is welded to the diffuser ring.

In some embodiments, apertures extend through the diffuser ring, the apertures in fluid flow communication with the inlets of the air manifold.

In some embodiments, the air manifold includes a body defining a flow passage, the inlets defined by the body and longitudinally distributed along a body axis of the body.

In some embodiments, the body axis extends in a direction being mainly circumferential relative to the central axis.

In some embodiments, an air line is pneumatically connected to the outlet of the air manifold, an entirety of the air line is located radially between the radially inner end and the radially outer end.

In some embodiments, the inlets includes three air inlets circumferentially interspaced from one another relative to the central axis.

BRIEF DESCRIPTION OF THE DRAWINGS

Reference is now made to the accompanying figures in which.

DETAILED DESCRIPTION

Figure 1:
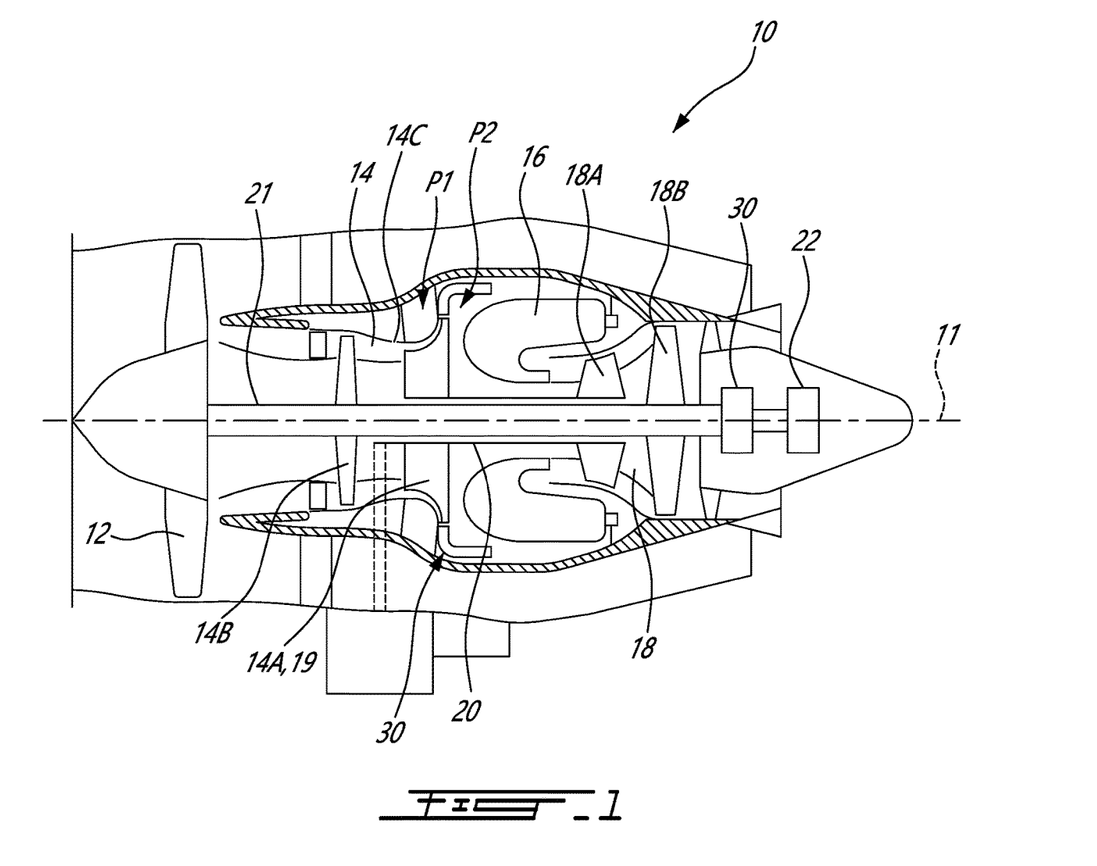
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

In the embodiment shown in FIG. 1, the high-pressure compressor 14A is a centrifugal compressor that includes an impeller 19 which comprises the compressor rotor 19. A diffuser 30 is located downstream of the impeller 19. The diffuser 30 receives air that has been compressed via its passage between blades of the impeller 19 and, given the radially directed exit of the impeller 19, changes an orientation of the air flow from being oriented in a substantially radial direction relative to the central axis 11 to being oriented in a substantially axial direction. The air outputted by the diffuser 30 in the substantially axial direction is then fed to the combustor 16 to be mixed with fuel for combustion.

The diffuser 30 is located between a first plenum P1 and a second plenum P2. The first plenum P1 is in fluid communication with a bleed outlet 14C of the compressor section 14. The second plenum P2 is in fluid communication with an outlet of the high-pressure compressor 14A. The bleed outlet 14C may be located upstream of the outlet of the high-pressure compressor 14A. Hence, a pressure of the air bled from the bleed outlet 14C may be less than the pressure of the air exiting the high-pressure compressor 14A. Thus, a pressure inside the second plenum P2 is greater than that in the first plenum P1. The air of the first plenum P1 may be fed to a secondary air system of the gas turbine engine 10. This secondary air system may use bleed air from the compressor section 14 to feed other components. For instance, the secondary air system may feed compressed air for pressurizing a bearing cavity, cooling down components of a hot section of the gas turbine engine 10, and so on.

Figure 2:
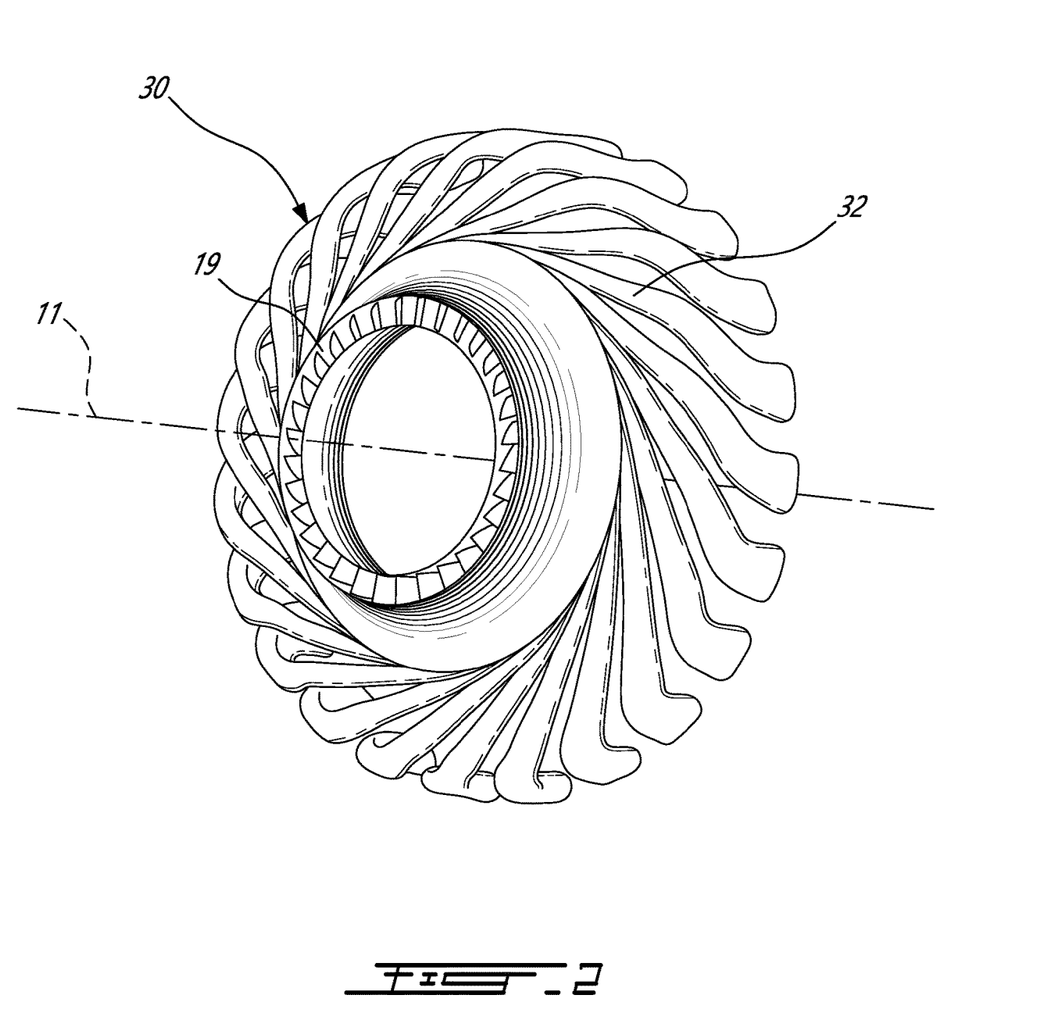
FIG. 2 is a perspective view of an impeller and diffuser pipes of a centrifugal compressor of the gas turbine engine of FIG. 1.
Figure 3:
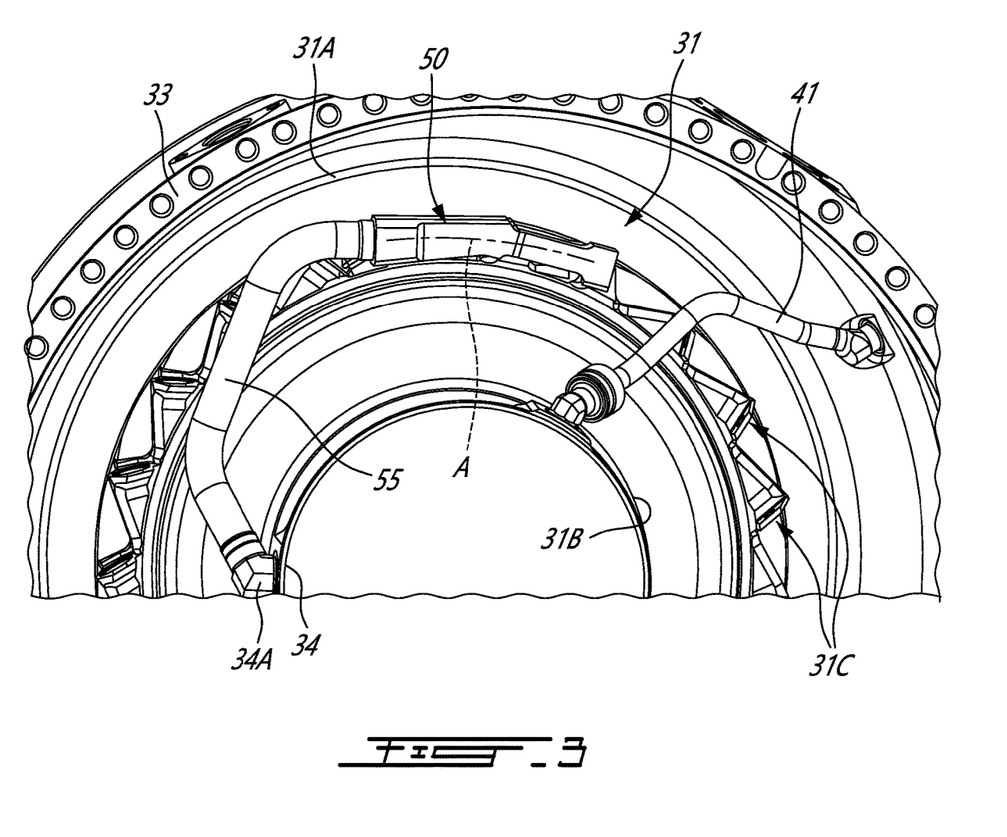
FIG. 3 is a front three dimensional view of a downstream side of a diffuser ring illustrating an air manifold in accordance with one embodiment.

Referring to FIGS. 2-3, the diffuser 30 includes a diffuser ring 31 and a plurality of diffuser pipes 32 secured to the diffuser ring 31. The diffuser ring 31 may have a frustoconical shape and extends circumferentially around the central axis 11. The diffuser ring 31 may be a single monolithic body extending a full circumference around the central axis 11. In some other embodiments, the diffuser ring 31 includes a plurality of ring segments circumferentially distributed around the central axis 11 and interconnected to one another. The diffuser pipes 32 are circumferentially distributed about the central axis 11 and each receives a portion of the air exiting the impeller 19 flows this portion towards the combustor 16. As shown, the diffuser pipes 32 have shape that curve in a tangential direction and in an axial direction. Other shapes are however contemplated. The diffuser pipes 32 may re-orient the compressed air exiting the impeller 19 from the radial direction to the axial direction.

Referring more particularly to FIG. 3, the diffuser ring 31 is illustrated. The diffuser ring 31 is secured to an outer casing 33 at its radially-outer end 31A and to an inner casing 34 at its radially inner end 31B. In some embodiments, the outer casing 33 and/or the inner casing 34 may be monolithic with the diffuser ring 31. The diffuser ring 31 defines a plurality of ports 31C each securable to a respective one of the diffuser pipes 32. These ports 31C output air from the impeller 19 and feed this air to inlets of the diffuser pipes 32.

Figure 4:
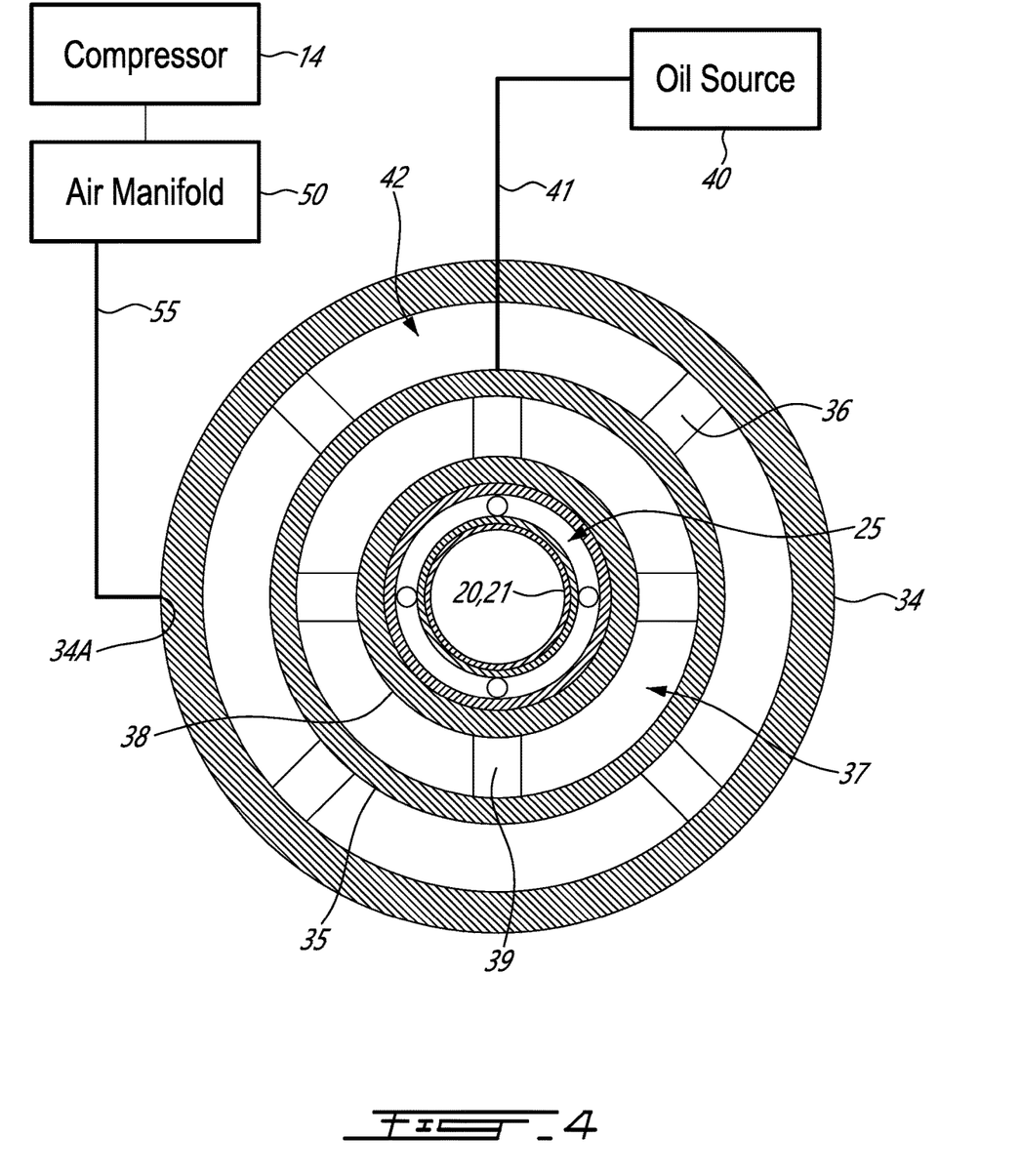
FIG. 4 is a cross-sectional view of a portion of the diffuser ring of FIG. 3.

Referring more particularly to FIG. 4, the inner casing 34 encloses a bearing housing 35. In the embodiment shown, first struts 36 are used to secure the bearing housing 35 to the inner casing 34. These first struts 36—four in the embodiment shown, but more or less is contemplated—are circumferentially distributed about the central axis 11. The bearing housing 35 defines a bearing cavity 37 that contains one or more bearing(s) 25 used for rollingly supporting either of the low-pressure shaft 21 and the high-pressure shaft 20. The bearing(s) 25 has inner and outer races as known in the art. The outer race of the bearing(s) 25 may be radially supported by a bearing support 38. The bearing support 38 may be secured to the bearing housing 35 via second struts 39, four in the embodiment shown, but more or less may be used. The second struts 39 may be circumferentially interspaced between the first struts 36. Other configurations are contemplated.

In the present embodiment, the bearing cavity 37 is hydraulically connected to an oil source 40 via suitable line or tube 41. The oil thus injected in the bearing cavity 37 from the oil source 40 is used for lubricating the bearing(s) 25. However, care should be taken to limit this oil from leaking out of the bearing cavity 37. This may be achieved first by providing seals between the bearing housing 35 and the shaft 20, 21 at axial extremities of the bearing housing 35, and by pressurizing a volume 42 that contains the bearing housing 35. In the present embodiment, the volume 42 is defined by the inner casing 34, which is secured to the radially-inner end 31B of the diffuser ring 31. In other words, the volume 42 extends radially from the bearing housing 35 to the inner casing 34 and extends circumferentially around the central axis 11.

The volume 42 may be pneumatically connected to the compressor section 14 for receiving compressed air from the compressor section 14. Thus, in use, a pressure inside the volume 42 may be greater than a pressure inside the bearing cavity 37. This may induce a flow of compressed air from the volume 42, through the seals, and towards the bearing cavity 37 thereby limiting oil from leaking out of the bearing cavity 37. In the present embodiment, the volume 42 is fed with compressed air extracted from the compressor section 14 via the bleed outlet 14C (FIG. 1) of the compressor section 14.

Typically, an external line is used to feed the volume 42. This external line has an inlet in fluid communication with the first plenum P1 and an outlet connected to a boss secured to the outer casing 33. This external line may be complicated to install, may present potential leak locations, may add weight, and so on. The diffuser ring 31 of the present disclosure may at least partially alleviate these drawbacks.

Referring back to FIG. 3, the diffuser 30 includes an air manifold 50 that is secured to the diffuser ring 31. The air manifold 50 may be welded to the diffuser ring 31. The air manifold 50 and the diffuser ring 31 may be parts of a single monolithic body. The air manifold and the diffuser ring may be cast as a single piece. The air manifold 50 is used to receive compressed air form the first plenum P1 and to feed this compressed air to the volume 42 that contains the bearing cavity 37. The air manifold 50 may be a machined part.

Figure 5:
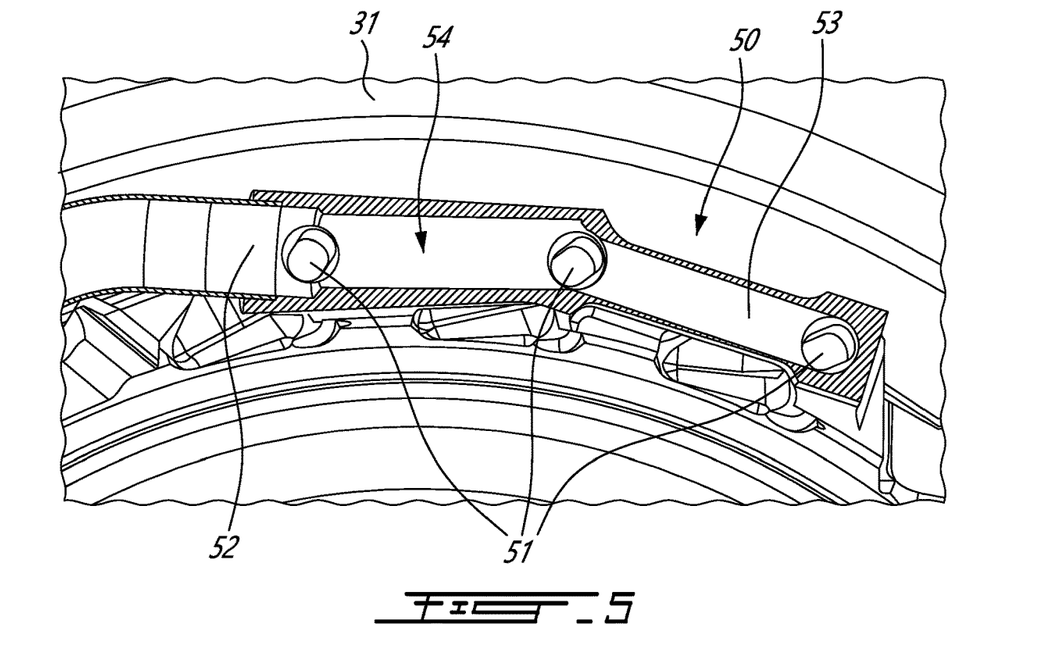
FIG. 5 is a three dimensional cutaway view of the air manifold secured to the diffuser ring of FIG. 3.
Figure 6:
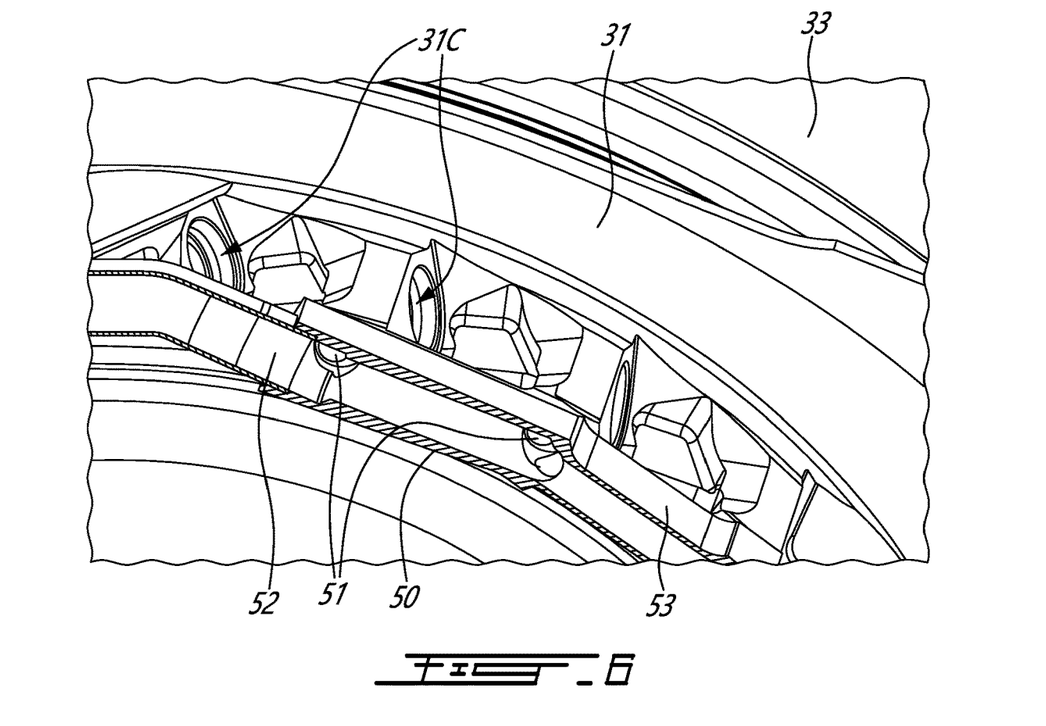
FIG. 6 is another three dimensional cutaway view of the air manifold of FIG. 3.

Referring to FIGS. 3 and 5-6, the manifold 50 has inlets 51, three inlets 51 in the present embodiment, but more or less may be used, and an outlet 52 in fluid flow communication with the inlets 51. The manifold 50 has a manifold body 53 that defines the inlets 51 and the outlet 52. The manifold body 53 has a body axis A (FIG. 3) that extends in a direction being mainly circumferential relative to the central axis 11. In other words, the manifold body 53 may follow a curvature of the diffuser ring 31. Herein, the expression "mainly circumferential" implies that a main component of the body axis A is within the circumferential direction relative to the central axis A. The manifold body 53 defines a flow passage 54 that extends along the body axis A and that connects the inlets 51 to the outlet 52. The inlets 51 may be distributed longitudinally along the body axis A. The inlets 51 may be circumferentially offset form one another relative to the central axis A. The diffuser ring 31 has an upstream side that faces the first plenum and a downstream side that faces the second plenum P2. In the present embodiment, the air manifold 50 is secured to the downstream side of the diffuser ring 31. Thus, the air manifold 50 may be located inside the second plenum P2.

In the present embodiment, the outlet 52 of the air manifold 50 is pneumatically connected to a connection port 34A (FIG. 3) of the inner casing 34 via an air line 55 (e.g. tube). As shown, this air line 55 is located radially between the outer casing 33 and the inner casing 34. An entirety of this air line 55 may be located radially inwardly of the inner casing 34. The air manifold 50 therefore may avoid having to flow the compressed air via a line that extends radially outwardly of the outer casing 33. The air line 55 may therefore be shorter, thereby minimizing weight and pressure drops.

Figure 7:
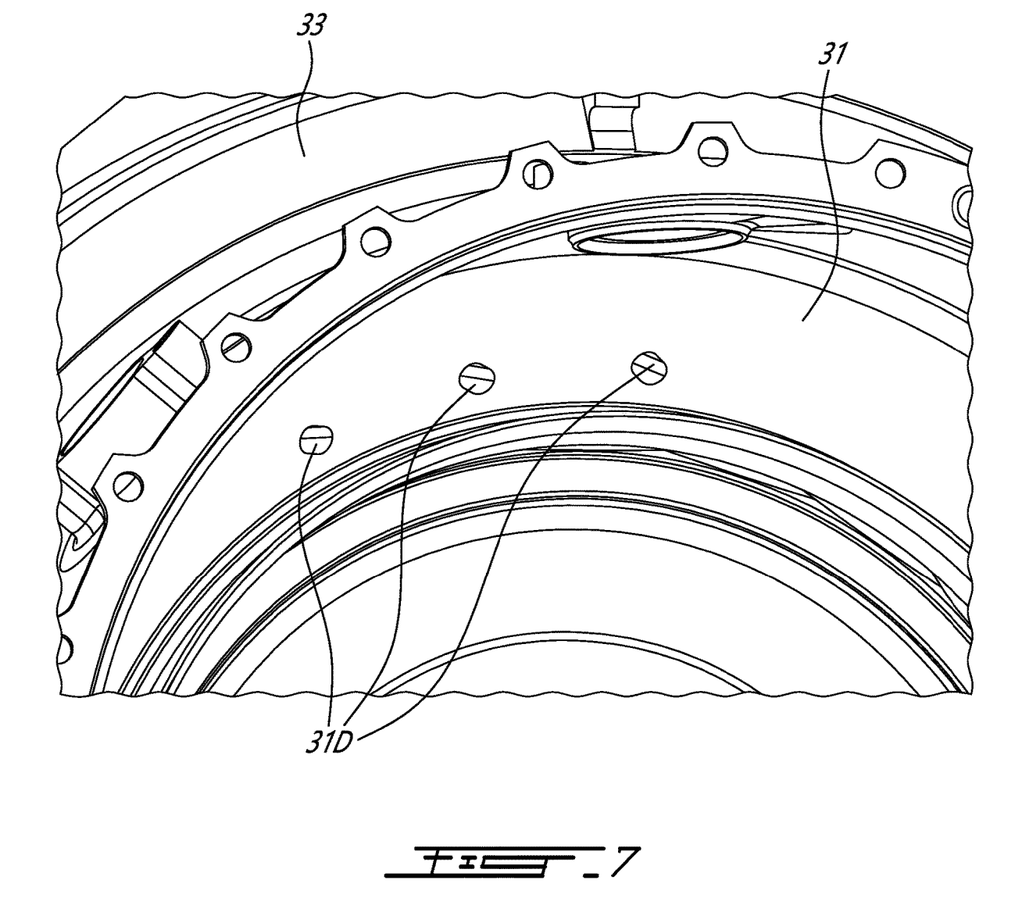
FIG. 7 is a three dimensional view illustrating an upstream side of the diffuser ring of FIG. 3.

Referring now to FIG. 7, apertures 31D, three in the embodiment shown, are defined through the diffuser ring 31. Each of the apertures 31D extend through the diffuser ring 31 from the upstream side to the downstream side and opens to a respective one of the inlets 51 of the air manifold 50. In other words, the air within the first plenum P1 flows to the volume 42 enclosing the bearing housing 35 (FIG. 4) via the apertures 31D defined through the diffuser ring 31, via the inlets 51 of the air manifold 50, via the flow passage 54 of the manifold body 53, via the outlet 52 of the air manifold 50, and, in the present embodiment, via the air line 55 that is connected to the connection port 34A of the inner casing 34.

The disclosed manifold may provide a more precise control over the quantity of air that is fed to the bearing cavity 37. For instance, the diameters of the apertures 31D, the number of inlets 51 of the air manifold 50, etc. may be tuned as a function of secondary air requirement during a design phase for each engine. Also, the elimination of the long tube that goes outside the outer casing 33 may provide a shorter air path, which in turn may reduce pressure drops, weight, and cost. In turn, this may provide an increased reliability, reduced part count, reduced number of interfaces between components, improve life by reducing thermal induced stress since the air line 55 does not have to flow between a hot zone and a cold zone, cost and weight reductions.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine comprising:
a compressor section having a compressor rotor rotatable about a central axis;
a diffuser downstream of the compressor rotor, the diffuser including a diffuser ring extending circumferentially around the central axis;
a bearing housing secured to the diffuser ring, the bearing housing contained within a volume located radially inwardly of the diffuser ring; and
an air manifold secured to the diffuser ring, the air manifold defining inlets in fluid flow communication with the compressor section and an outlet in fluid flow communication with the volume.

2. The aircraft engine of claim 1, wherein the air manifold and the diffuser ring are parts of a single monolithic body.

3. The aircraft engine of claim 1, wherein the air manifold is welded to the diffuser ring.

4. The aircraft engine of claim 1, wherein the diffuser ring is located between a first plenum and a second plenum, the first plenum pneumatically connected to a bleed outlet of the compressor section, the second plenum pneumatically connected to an outlet of the compressor section downstream of the bleed outlet, the inlets of the air manifold in fluid flow communication with the first plenum.

5. The aircraft engine of claim 4, wherein the diffuser ring has an upstream side facing the first plenum and a downstream side facing the second plenum, the air manifold located on the downstream side.

6. The aircraft engine of claim 5, wherein apertures extend through the diffuser ring, the apertures in fluid flow communication with the inlets of the air manifold.

7. The aircraft engine of claim 1, wherein the air manifold includes a body defining a flow passage, the inlets defined by the body and longitudinally distributed along a body axis of the body.

8. The aircraft engine of claim 7, wherein the body axis extends in a direction being mainly circumferential relative to the central axis.

9. The aircraft engine of claim 1, wherein the outlet is pneumatically connected to an air line, the air line pneumatically connected to a connection port defined by an inner casing secured to a radially-inner end of the diffuser ring.

10. The aircraft engine of claim 9, comprising an outer casing, the diffuser ring having a radially-outer end secured to the outer casing, the air manifold located radially inwardly of the outer casing.

11. The aircraft engine of claim 10, wherein an entirety of the air line is located radially between the inner casing and the outer casing.

12. The aircraft engine of claim 1, wherein the inlets includes three air inlets circumferentially interspaced from one another relative to the central axis.

13. A diffuser for a compressor section of an aircraft engine, comprising
a diffuser ring extending circumferentially around a central axis, the diffuser ring having a radially inner end and a radially outer end; and
an air manifold secured to the diffuser ring radially between the radially inner end and the radially outer end, the air manifold defining inlets in fluidly connectable to the compressor section and an outlet fluidly connectable to a bearing housing.

14. The diffuser of claim 13, wherein the air manifold and the diffuser ring are parts of a single monolithic body.

15. The diffuser of claim 13, wherein the air manifold is welded to the diffuser ring.

16. The diffuser of claim 13, wherein apertures extend through the diffuser ring, the apertures in fluid flow communication with the inlets of the air manifold.

17. The diffuser of claim 13, wherein the air manifold includes a body defining a flow passage, the inlets defined by the body and longitudinally distributed along a body axis of the body.

18. The diffuser of claim 17, wherein the body axis extends in a direction being mainly circumferential relative to the central axis.

19. The diffuser of claim 13, comprising an air line pneumatically connected to the outlet of the air manifold, an entirety of the air line is located radially between the radially inner end and the radially outer end.

20. The diffuser of claim 13, wherein the inlets includes three air inlets circumferentially interspaced from one another relative to the central axis.

* * * * *